United States Patent [19]

Ikeda et al.

[11] Patent Number: 5,896,501
[45] Date of Patent: *Apr. 20, 1999

[54] MULTIPROCESSOR SYSTEM AND PARALLEL PROCESSING METHOD FOR PROCESSING DATA TRANSFERRED BETWEEN PROCESSORS

[75] Inventors: Masayuki Ikeda; Shigeru Nagasawa; Haruhiko Ueno; Naoki Shinjo; Teruo Utsumi; Kazushige Kobayakawa; Naoki Sueyasu; Kenichi Ishizaka; Masami Dewa; Moriyuki Takamura, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/795,689

[22] Filed: Feb. 4, 1997

Related U.S. Application Data

[63] Continuation of application No. 08/111,932, Aug. 26, 1993, abandoned.

[30] Foreign Application Priority Data

Dec. 18, 1992 [JP] Japan .................................. 4-338505

[51] Int. Cl.⁶ .................................................. G06F 15/167
[52] U.S. Cl. ................ 395/200.46; 711/203; 395/200.45
[58] Field of Search ............................... 395/412, 416, 395/200, 200.46, 200.45; 711/202, 203

[56] References Cited

U.S. PATENT DOCUMENTS

| | | | |
|---|---|---|---|
| 4,149,242 | 4/1979 | Pirz | 711/5 |
| 4,388,685 | 6/1983 | Kotok et al. | 711/2 |
| 4,455,602 | 6/1984 | Baxter et al. | 395/825 |
| 4,455,647 | 6/1984 | Gueldner | 370/270 |
| 4,485,438 | 11/1984 | Myrmo et al. | 711/100 |
| 4,731,734 | 3/1988 | Gruner et al. | 711/202 |
| 4,742,447 | 5/1988 | Duvall et al. | 395/406 |
| 4,777,589 | 10/1988 | Boettner et al. | 395/823 |
| 4,843,542 | 6/1989 | Dashiell et al. | 711/119 |

(List continued on next page.)

FOREIGN PATENT DOCUMENTS

| | | |
|---|---|---|
| 0208428 | 1/1987 | European Pat. Off. . |
| 0387644 | 9/1990 | European Pat. Off. . |
| 0431467 | 6/1991 | European Pat. Off. . |
| 0457345 | 11/1991 | European Pat. Off. . |

OTHER PUBLICATIONS

"The Architecture of the Sure System 2000 Communications Processor," A. Kabemoto et al., IEEE Micro, vol. 11, No. 4, Aug. 1991, New York, pp. 28–31 and 73–78.
Patent Abstracts of Japan, vol. 14, No. 341 (P–1081), Jul. 24, 1990.

Primary Examiner—Parshotam S. Lall
Assistant Examiner—Kenneth R. Coulter
Attorney, Agent, or Firm—Staas & Halsey

[57] ABSTRACT

A parallel processing apparatus and method for processing data transferred between a plurality of processors each having a storage. Each of the plurality of processors corresponds a global virtual address in a global virtual memory space where a parallel processing between the plurality of processors is performed and a local virtual address in a local virtual memory space where an individual process in one of the processors is performed to an identical real address. Data is transferred from a first one of the plurality of processors to a second one of the plurality of processors by writing the data into the storage of the second processor according to the global virtual address or the local virtual address of the second processor, the second processor is notified of the global virtual address or the local virtual address of the transferred data, the notified global virtual address or the notified local virtual address is then translated into the real address which corresponds to the notified global virtual address or the notified local virtual address, data is read from the storage of the second processor to the second processor according to the translated real address, and the read data is calculated in the second processor.

8 Claims, 15 Drawing Sheets

U.S. PATENT DOCUMENTS

| | | | |
|---|---|---|---|
| 4,881,164 | 11/1989 | Hailpern et al. | 711/207 |
| 4,939,636 | 7/1990 | Nakagawa et al. | 395/474 |
| 5,036,459 | 7/1991 | den Haan et al. | 395/200.67 |
| 5,123,094 | 6/1992 | MacDougall | 395/800.3 |
| 5,247,629 | 9/1993 | Casamatta et al. | 395/416 |
| 5,392,416 | 2/1995 | Doi et al. | 711/3 |
| 5,430,850 | 7/1995 | Papadopoulos et al. | 395/683 |
| 5,437,016 | 7/1995 | Ikegaya et al. | 711/6 |
| 5,522,045 | 5/1996 | Sandberg | 395/200.45 |
| 5,606,666 | 2/1997 | Grant et al. | 395/200.46 |
| 5,649,141 | 7/1997 | Yamazaki | 395/416 |

| | PARTITIONED LOCAL SPACE OF ARRAY A | PARTITIONED GLOBAL SPACE OF ARRAY B | PARTITIONED LOCAL SPACE OF ARRAY C | SHARE OF CALCULATION PROCESS |
|---|---|---|---|---|
| PE 1 | A( 2:100) | B( 1:100) | C( 1:100) | I= 2-100 |
| PE 2 | A(101:200) | B(101:200) | C(101:200) | I=101-200 |
| PE 3 | A(201:300) | B(201:300) | C(201:300) | I=201-300 |
| PE 4 | A(301:400) | B(301:400) | C(301:400) | I=301-400 |
| PE 5 | A(401:500) | B(401:500) | C(401:500) | I=401-500 |
| PE 6 | A(501:600) | B(501:600) | C(501:600) | I=501-600 |
| PE 7 | A(601:700) | B(601:700) | C(601:700) | I=601-700 |
| PE 8 | A(701:800) | B(701:800) | C(701:800) | I=701-800 |
| PE 9 | A(801:900) | B(801:900) | C(801:900) | I=801-900 |
| PE10 | A(901:999) | B(901:1000) | C(901:1000) | I=901-999 |

MULTIPROCESSOR SYSTEM AND PARALLEL PROCESSING METHOD FOR PROCESSING DATA TRANSFERRED BETWEEN PROCESSORS

This application is a continuation of application Ser. No. 08/111,932, filed Aug. 26, 1993, now abandoned.

BACKGROUND OF THE INVENTION

1. Field of the Invention

The present invention relates to a multiprocessor system in which processors communicate with each other to execute parallel processing and, more particularly, to a method and apparatus for transferring and processing data in a multiprocessor system.

2. Description of the Related Art

In recent years, computer systems operating at higher speeds and having larger capacities have been required. To satisfy this requirement, it is necessary to prepare a plurality of processors and to distribute processing among them to effect parallel processing. That is, parallel processing techniques have been needed.

As one multiprocessing technique using plural processors, a multiprocessor system has been proposed in which main storage is distributed among plural portions, controlled by their respective processors, which execute parallel processing. This multiprocessor system is known as a memory-distributed parallel processing system, for example. In this system, processors operate in parallel while exchanging data with each other via a communication system. Thus, all the processors operate concurrently to execute one process.

Generally, when a calculation is performed by such a multiprocessor system, data that is necessary for a first processor to execute the calculation is conveyed from those storage regions of the main storage which are ancillary to one or more second processors to the storage region of the main storage ancillary to the first processor. When the data required for the calculation is completely loaded into the storage region of the main storage ancillary to the first processor, the first processor executes the calculation. The result of the calculation is stored in the storage region of the main storage ancillary to a third processor which is to hold or store the result. In this case, it is not necessary that the first through third processors all be separate units. Sometimes, some of the processors are a common processor. The processor system carries out parallel batch processing according to a sequence of procedures described above. The processors repeatedly execute the above-described processing synchronously, whereby parallel processing is performed.

Specifically, before processors perform arithmetic operations, data is usually transferred between a first processor i for performing the arithmetic operations and a second processor j having data necessary for the arithmetic operations. In this case, in order to transfer the data, the first processor i transmits to the second processor j a request for the transfer. Then, the second processor j transfers data about reading to the first processor i. Alternatively, the second processor j causes data to be written to the storage region of the main storage ancillary to the first processor i.

In order to universally realize the logic of the above-described processing, transfer of data within the main storage is needed even if the first processor i and the second processor j are the same processor, because their respective real addresses in the main storage are different.

It takes a long time for a conventional multiprocessor systems to transfer data between processors or between storage regions. Hence, it has not been possible to execute parallel processing quickly. Consequently, there is a demand for a technique for shortening the data transfer time.

SUMMARY OF THE INVENTION

It is an object of the present invention to provide a method and apparatus for transferring data in a shorter time within a multiprocessor system, so as to execute parallel processing at higher speeds.

The system for transferring and processing data according to the present invention comprises a plurality of processors and a communication system for linking these processors together. The processors have storages for storing data and executing processing. The communication system transfers data and information between plural processors. The processors carry out processes in parallel, and each processor is constructed as described below.

A common address translator section corresponds to a common space used by every processor, and translates a virtual address into a real address. An inherent address translator section corresponds to an inherent space used only by one processor incorporating this inherent address translator and translates a virtual address into a real address. A virtual address and a corresponding virtual address in the inherent address translator section are made to correspond to an identical real address.

A transfer control section writes or reads data to or from a storage according to the real address translated by the inherent address translator section or by the common address translator section. Thus, data is transferred between the one processor and another processor.

An arithmetic section reads data from the storage of the one processor according to a real address translated by the inherent address translator section of the one processor, provided that data transferred by the transfer control section exists in the common space corresponding to the common address translator section of the one processor. Then, the arithmetic section performs arithmetic operations.

A method of transferring and processing data according to the invention consists of transferring data and information between plural processors to cause them to execute parallel processing.

In a step for translating an address, a virtual address is translated into a real address by a common address translation corresponding to a common space used by every processor and by an inherent address translation corresponding to an inherent space used only by a corresponding one of the processors. The virtual address subjected to the common address translation and the virtual address subjected to the inherent address translation are made to correspond to an identical address.

In a step for controlling transfer, data is written into or read from a storage of the one processor according to the real address translated by the inherent address translation or by the common address translation. Thus, data is transferred between the one processor and another processor.

In a step for performing calculations, if data transferred to the one processor exists in the common space corresponding to the common address translation performed in the one processor, data is read from the storage of the one processor according to a real address translated by an intrinsic address translation performed in the one processor, and calculations are performed.

An address control section is provided so that a virtual address applied to the common address translator section and a corresponding virtual address applied to the intrinsic address translator section are made to correspond to an identical real address.

If data necessary for calculations exists in another processor, the transfer control section introduces the data necessary for the calculations into the common space from the other processor and then transfers the data to an intrinsic space.

An information storage and a selector section are also provided. The information storage stores access information indicating attributes for having access to the storage in the one processor and to the storage in the other processor, in association with data. The information storage section also stores space discrimination information for discriminating between the common space and the inherent space. The selector section selects either the inherent address translator section or the common address translator section according to the space discrimination information stored in the information storage.

The aforementioned access information contains data about a processor that is to receive, data used to determine whether data is transferred for reading or writing, the length of the body of data, a transmitting address, and a receiving address.

In the novel transfer of data, virtual addresses are translated into real addresses by both a common address translation corresponding to the common space used by every processor in common and by an inherent address translation corresponding to an inherent space used only by a corresponding one of the processors. The virtual address subjected to the common address translation and the virtual address subjected to the inherent address translation are made to correspond to an identical real address.

Data is written to or read from a storage according to the real address translated either by the inherent address translation or by the common address translation. Thus, the data is transferred between the one processor and the other processor.

If data transferred to the one processor exists in the common space corresponding to the common address translation performed in the one processor, then the virtual address subjected to the common address translation and the virtual address subjected to the inherent address translation are made to correspond to an identical real address. Therefore, data stored in the memory of the one processor can be read out according to the real address translated by the inherent address translation performed by the one processor and calculations are performed without transferring data from the common space into the inherent space.

Accordingly, where calculations are performed, the time taken to transfer data from the common space to the inherent space can be shortened. In consequence, the speed of parallel processing can be increased.

Since the global space is made to correspond to the local space in this way, overhead can be reduced without needing complex algorithmic or extra access information when data is transferred between processors. This increases the speed of parallel processing.

Other objects and features of the invention will appear in the course of the description thereof, which follows.

BRIEF DESCRIPTION OF THE DRAWINGS

FIG. 16 is a diagram illustrating assignment of arrays to 10 processors of the system shown in FIG. 3;

FIG. 17 is a diagram illustrating a program to be run by a processor of the system shown in FIG. 3;

DETAILED DESCRIPTION OF THE PREFERRED EMBODIMENTS

Hereinafter the embodiments of the present invention will be described with reference to the accompanying drawings.
Embodiment 1

Figure 1:
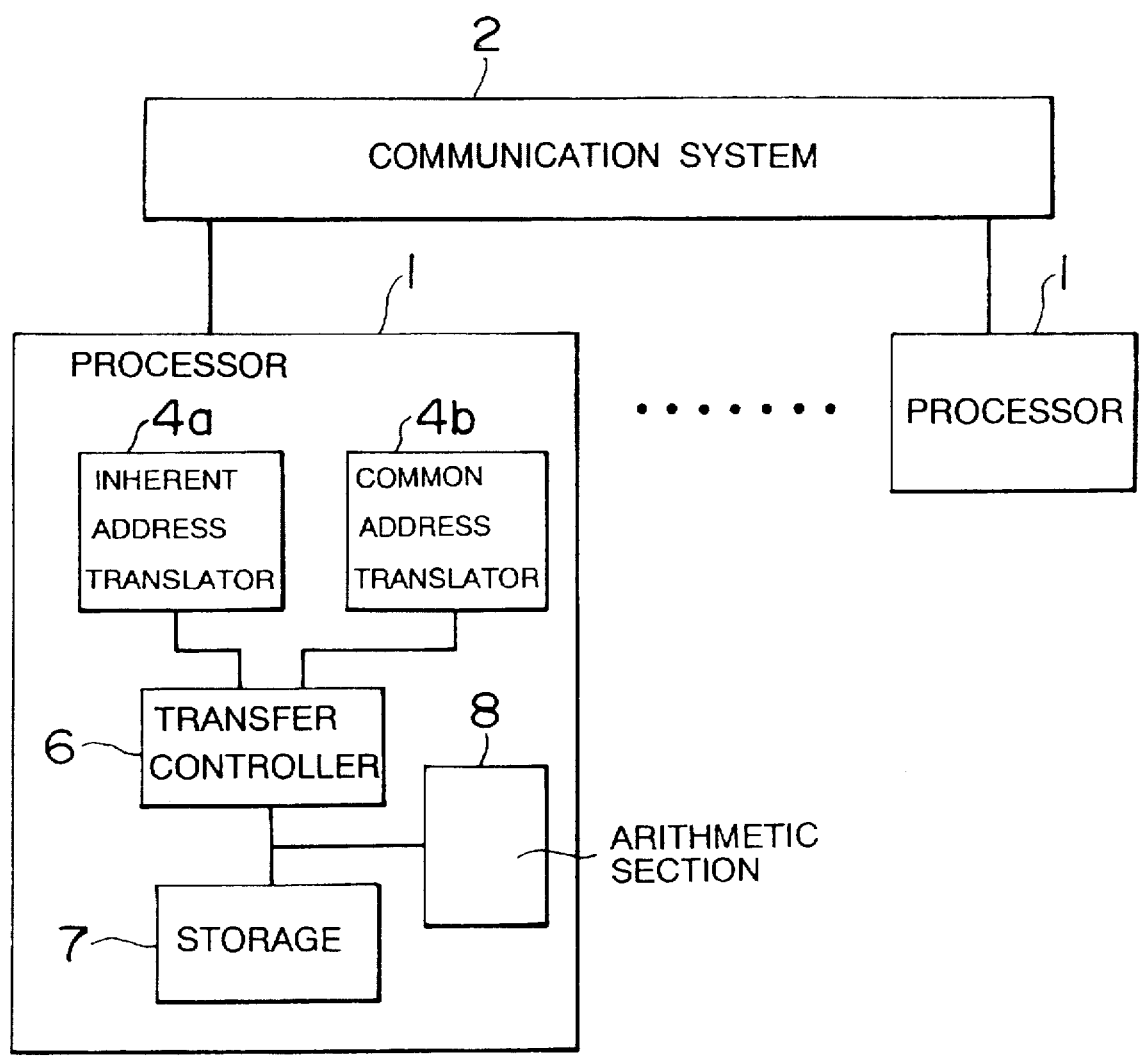
FIG. 1 is a block diagram of a multiprocessor system according to a first embodiment of the present invention.

Referring to FIG. 1, there is shown the structure of a first embodiment of a fundamental multiprocessor system containing a data transfer system according to the invention. This multiprocessor system has a plurality of processors 1 which are linked together by a communication system 2.

Each processor 1 has a storage 7 for storing data and for executing a given processing. The processors 1 transfer information such as data between each other via the communication system 2 and execute parallel processing.

Each processor 1 has an inherent address translator section 4a, a common address translator section 4b, a transfer control section 6, and an arithmetic section 8, in addition to the storage 7 described above.

The common address translator section 4b corresponds to a virtual global space that is a virtual address space used in common by all the processors 1. The translator section 4b translates a virtual address in the virtual global space into a real address in a real space. The inherent address translator section 4a corresponds to a virtual local space that is a virtual address space used only by a corresponding one of the processors 1, i.e., the processor 1 incorporating this translator section 4a, and translates a virtual address in the virtual local space into a real address in the real space. The virtual global space is principally a space used by all the processors 1 in common. The virtual local space is mainly used as a region in which local processes in one processor are performed. A virtual address in the global space which is applied to the common address translator section 4b and a corresponding virtual address in the local space which is applied to the inherent address translator section 4a are made to correspond to an identical real address.

The transfer control section 6 writes or reads data to or from the storage 7 according to a real address translated by the inherent address translator section 4a or the common address translator section 4b. As a result, data is transferred between one processor 1 and another processor 1.

If data transferred by the transfer control section 6 is present in the global space corresponding to the common address translator section 4b of the one processor, then the arithmetic section 8 reads data from the storage 7 of the one processor according to a real address in the local space corresponding to the inherent address translator section 4a of the one processor. Then, arithmetic operations are performed.

Figure 2:
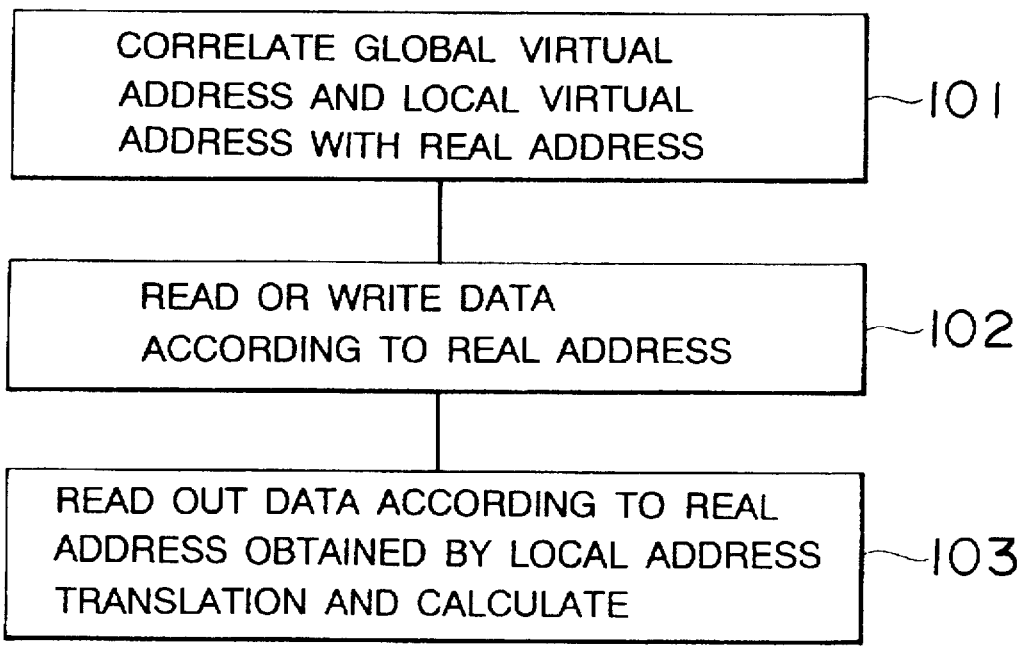
FIG. 2 is a flowchart illustrating the operation of the system shown in FIG. 1.

In this system, data and information are transmitted between plural processors so that they may execute parallel processing. This data transfer processing is described next in detail by referring to the flowchart of FIG. 2.

In address translation step 101, a virtual address is translated into a real address by a global address translation corresponding to the global space used by all the processors 1 in common and by a local address translation corresponding to a local space used only by a corresponding one of the processors. A virtual address subjected to the global address translation and a virtual address subjected to the local address translation are made to correspond to an identical real address.

In transfer control step 102, data is written into or read from the storage according to a real address translated by the local address translation or by the global address translation. In this manner, data is transferred between the one processor 1 and another processor 1.

In arithmetic operation step 103, if the transferred data exists in the global space corresponding to the global address translation performed by the one processor 1, data is read from the storage of the one processor 1 according to a real address translated by the local address translation that is performed by the one processor 1. This processor 1 then performs arithmetic operations.

If data necessary for the arithmetic operations exists in the storage 7 of another processor 1, the transfer control section 6 introduces the data necessary for the arithmetic operations into the global space from the another processor 1. The data is then transferred from the global space to the local space.

In this way, a virtual address is translated into a real address by the global address translation corresponding to the global space used by every processor 1 in common and by the local address translation corresponding to the local space used only by a corresponding one of the processors 1. A virtual address subjected to the global address translation and a virtual address subjected to the local address translation are made to correspond to an identical address. The aforementioned one processor 1 writes or reads data to or from its storage 7 according to a real address produced by the local address translation or by the global address translation. Thus, data is transferred to or from another processor 1.

In the one processor 1, if the transferred data exists in the global space corresponding to the global address translation performed by this processor, virtual addresses subjected to the global address translation and virtual addresses subjected to the local address translation are made to correspond to an identical address. Therefore, data can be read from the storage of this processor according to a real address translated by the local address translation that is done by this processor. Then, arithmetic operations are carried out.

Accordingly, when arithmetic operations are effected, the time taken to transfer data from the global space to any local space is shortened. That is, the system described thus far makes the global space correspond to any local space. Overheads can be decreased without needing complex algorithmic or extra access information when data is transferred between processors 1. This can speed up parallel processing.

Embodiment 2

Figure 3:
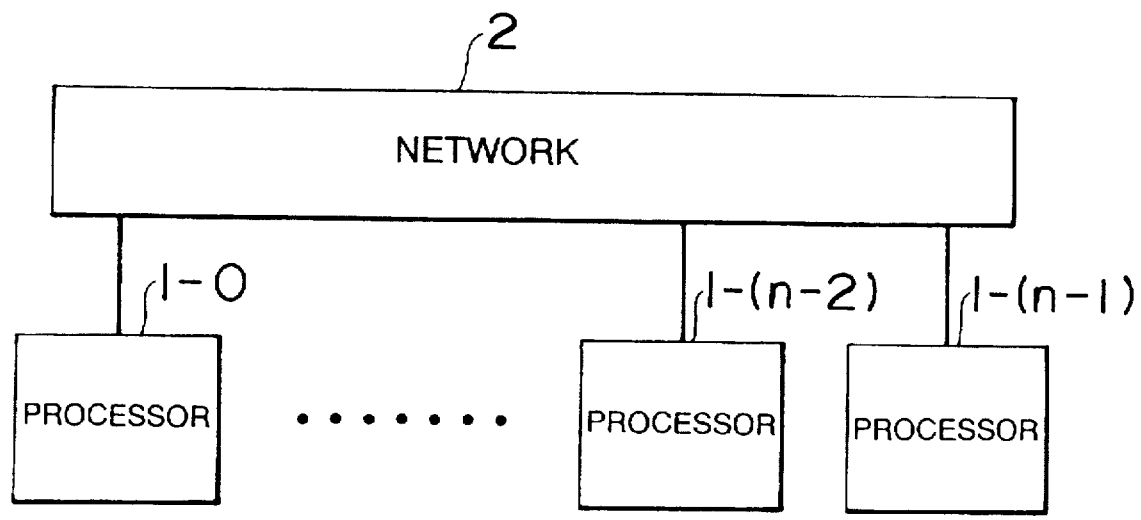
FIG. 3 is a block diagram of a multiprocessor system according to a second embodiment of the invention.
Figure 4:
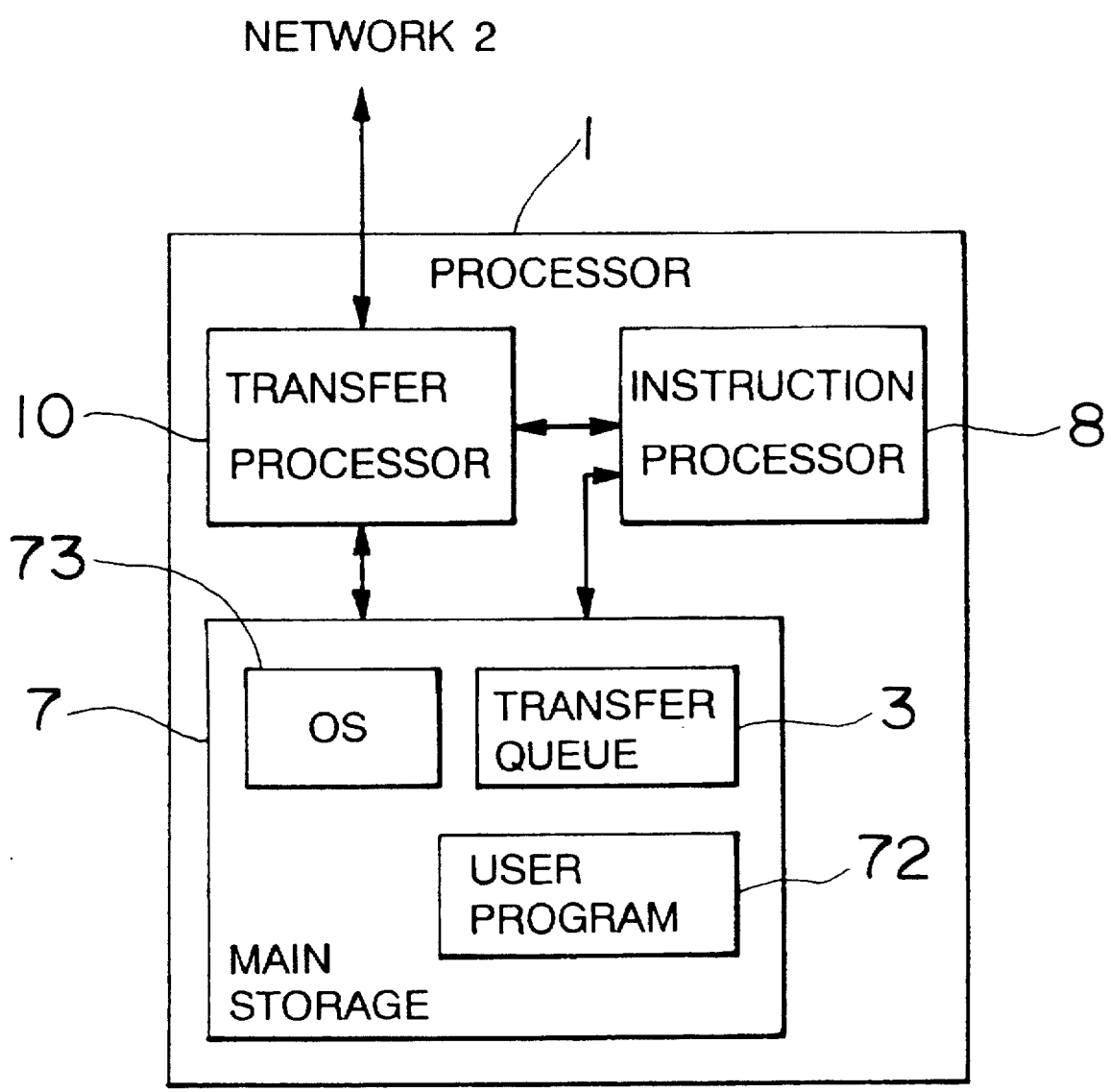
FIG. 4 is a block diagram of each processor included in the system shown in FIG. 3.

FIG. 3 is a block diagram of a second embodiment of a multiprocessor system according to the present invention. FIG. 4 is a block diagram of each processor included in the system shown in FIG. 3, specifically showing the structure of the processor.

Structure of Multiprocessor System

The multiprocessor system is equipped with a plurality of processors 1-0 through 1-(n−1) for executing processing and with a network 2 for connecting together these processors to permit transfer of data therebetween. (For ease of illustration, these processors 1-0 through 1-(n−1) are hereinafter often described simply by processors 1.)

As shown in FIG. 4, each processor 1 has a main storage 7, an instruction-processing section 8, and a transfer-processing section 10.

A user program 72 consisting of a plurality of instructions and data are stored in the main storage 7. A transfer queue 3 is stored in the main storage 7. This queue 3 formed by registering a header, or the header of a data packet, containing access information indicating access attributes for gaining access to that main storage 7 which is controlled by the processor 1 transmitting data and for having access to that main storage 7 which is controlled by the processor 1 receiving the data. An operating system (OS) or a supervisory program 73 (hereinafter collectively referred to as the operating system) is also stored in the main storage 7 of each processor. This program assists the execution of the user program 72. The operating system 73 functions before the instructions of the user program are executed or dynamically functions at the request of the user program to load 32-bit address translation information into each entry of an address translation table 4 (described later).

Figure 5:
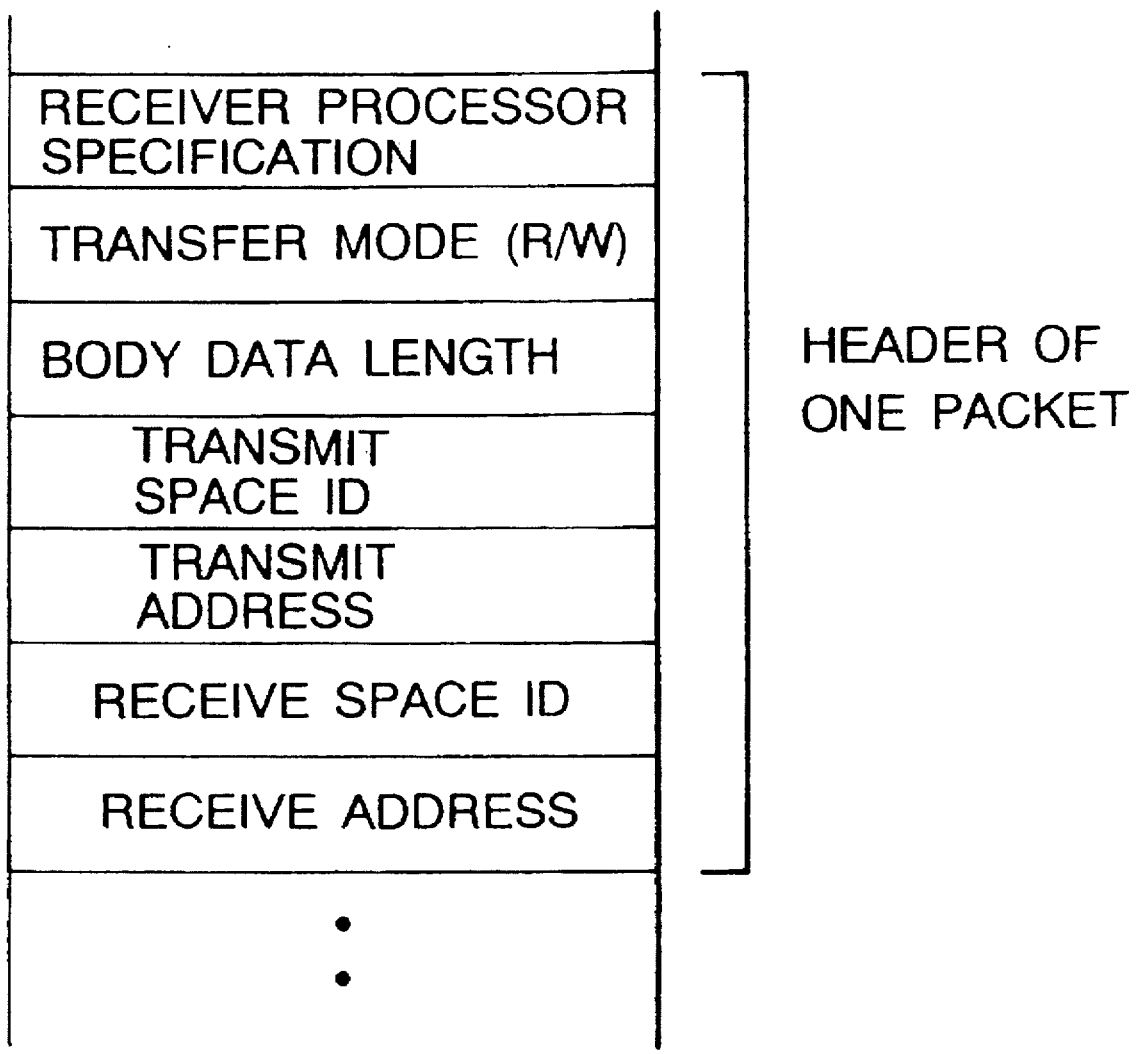
FIG. 5 is a pictorial representation of the configuration of a transfer queue used in the system shown in FIG. 3.

FIG. 5 illustrates the structure of the transfer queue 3. A header for one packet is loaded into the transfer queue 3 at every transfer request. As shown in FIG. 5, a header for one packet contains information for specifying a processor that is to receive, information about a transfer mode, information about the length of the body of data, an identifier (ID) for a transmitting space, a transmitting address, a receiving space ID, and a receiving address.

The information for specifying the receiving processor indicates the number given to a processor which should receive data. The information about the transfer mode indicates whether the data is read (R) or written (W). The information about the length of the body of data represents, in bytes, the data length of the body of the data in the form of packets specified by the header. The information about a transmitting address indicates the address of the data to be transmitted, the data being stored in the main storage 7 of the transmitting processor 1. The information about the receiving address indicates the address of data to be stored in the main storage 7 of the receiving processor.

The transmitting space ID (identifier) is used to discriminate between a global transmitting space and a local transmitting space, as described in detail later. The receiving space ID is employed to discriminate between a global receiving space and a local receiving space. Each packet of data actually transmitted is composed of header and body data specified by the header.

The instruction-processing section 8 of the processor 1 shown in FIG. 4 is coupled to the main storage 7, successively fetches instructions from the program in the main storage 7, and executes the instructions. The transfer-processing section 10 is coupled to the main storage 7 and to the instruction-processing section 8 to transfer the data in the form of the aforementioned packets between the main storage 7 of each processor 1 and the network 2.

Figure 6:
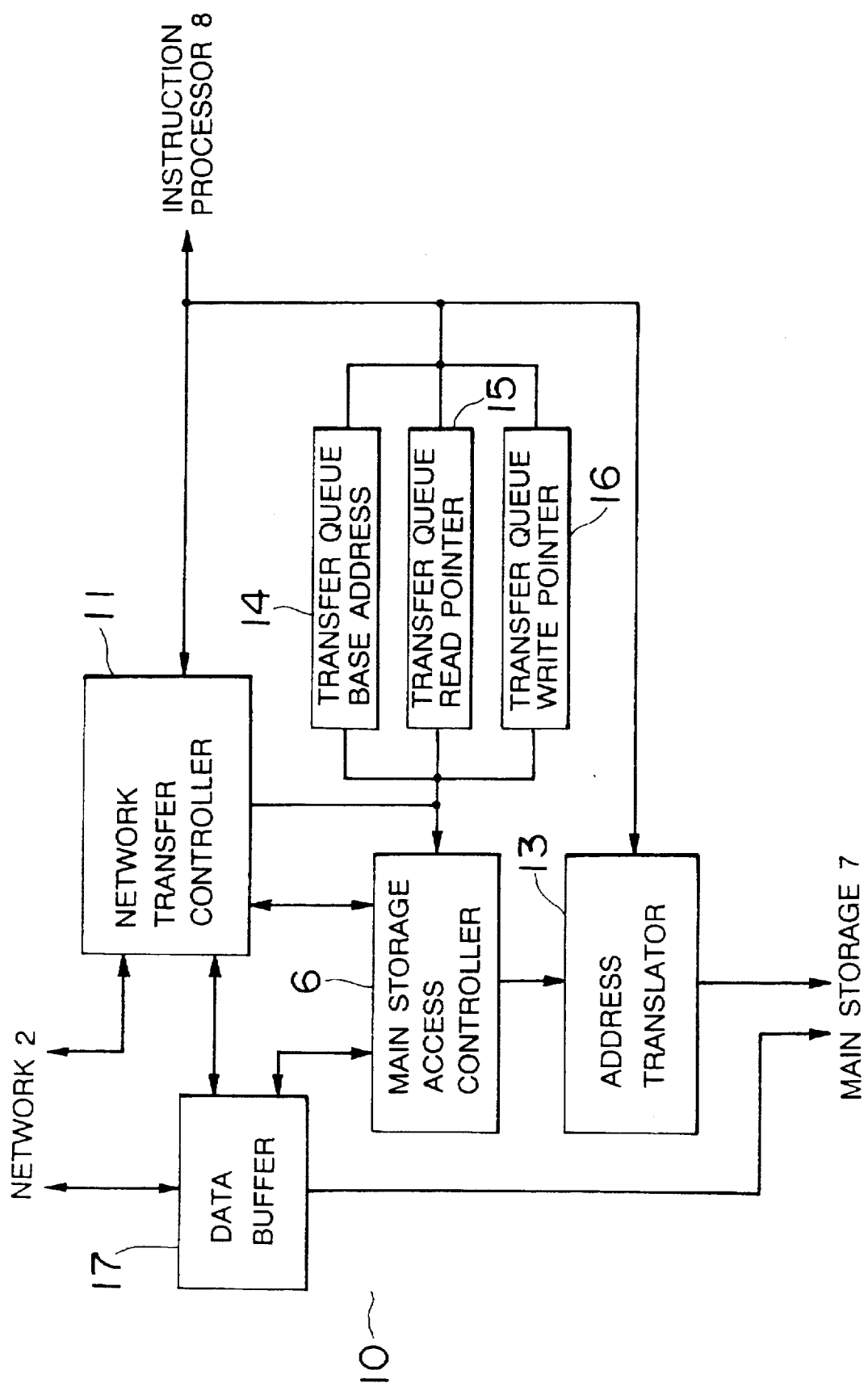
FIG. 6 is a block diagram of a transfer-processing section included in the system shown in FIG. 3.

FIG. 6 is a block diagram showing the structure of the transfer-processing section 10. The transfer-processing section 10 comprises a network transfer control section 11, a main storage access control section 6, an address translator section 13, a transfer queue base address register 14, a transfer queue reading pointer register 15, a transfer queue writing pointer register 16, and a data buffer 17.

The transfer queue base address register 14 acts to hold the forefront address of the transfer queue 3 in the main storage 7. The transfer queue writing pointer register 16 serves to maintain a pointer indicating to which position (packet) within the transfer queue 3 the instruction-processing section 8 has placed, or enqueued, access information (transfer request). The transfer queue reading pointer register 15 holds a pointer indicating to which position (i.e., to which packet) within the transfer queue 3 the network transfer control section 11 has performed data transfer processing.

As the execution of instructions progresses, the instruction-processing section 8 updates the values held in the transfer queue base address register 14, the transfer queue reading pointer register 15, and the transfer queue writing pointer register 16 or refers to these values.

When activated by instructions from the instruction-processing section 8, the network transfer control section 11 waits for enqueuing of a request for transfer. The network transfer control section 11 starts data transfer processing in response to instructions for starting a transfer according to the reading pointer value from the transfer queue reading pointer register 15 and to the writing pointer value from the transfer queue writing pointer register 16. Then, the network transfer control section 11 produces a main storage access request to the main storage access control section 6, for reading the header and the body data of the packet to be transferred. The packet data read from the main storage 7 is sent to the network 2 via the data buffer 17.

The main storage access control section 6 gains access to the main storage 7 at a request for main storage access from the network transfer control section 11, and controls transfer of packets between the main storage 7 and the data buffer 17.

The data buffer 17 temporarily stores data when data is transmitted between the main storage 7 and the network 2. Also, the buffer 17 temporarily stores data when writing or reading into or from the main storage 7 is performed as dictated by the network transfer control section 11 and by the main storage access control section 6.

Structure of Address Translator Section

The address translator section 13 translates addresses according to space ID value used for access to the main storage 7 specified by the header, and generates an access address to the main storage 7. The address translator section 13 translates a virtual address (logical address) into a real address (physical address).

Figure 7:
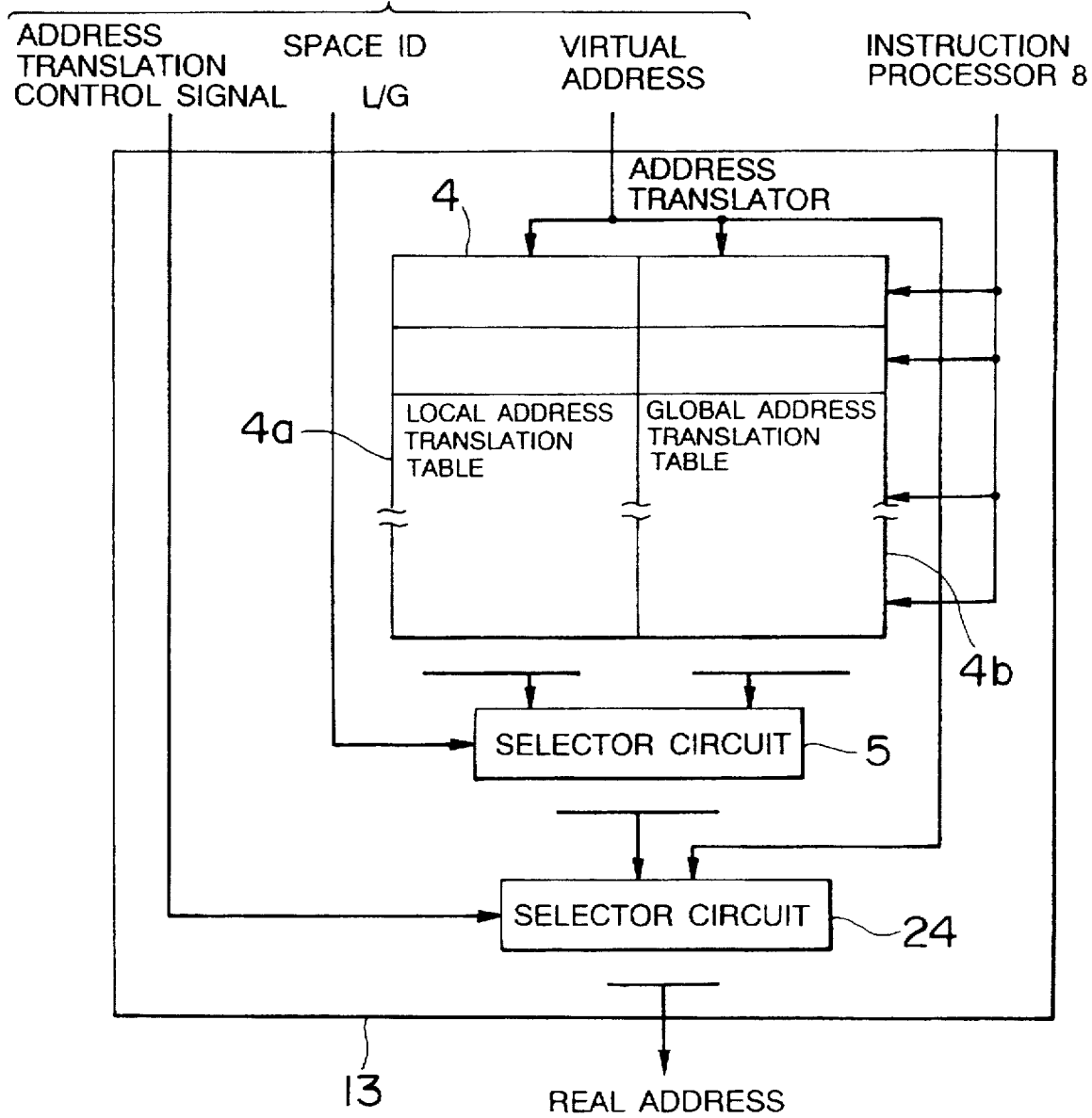
FIG. 7 is a block diagram of an address translator section included in the system shown in FIG. 3.

FIG. 7 is a block diagram showing the structure of the address translator section 13. This translator section 13 has the aforementioned address translation table (memory) 4, a selector circuit 5, and another selector circuit 24. Each processor 1 assigns a global space and a local space to a virtual space used when data is transferred between processors 1. For this purpose, the address translation table 4 has a local address translation table 4a and a global address translation table 4b. The local address translation table 4a of each processor 1 corresponds to transmitting space ID=0, and is a table for translating a virtual address into a real address to have access to the local space that is inherent in each one of the processors 1. The global address translation table 4b corresponds to transmitting space ID=1, and is a table for translating a virtual address into a real address to gain access to the global space used as a space used by every processor 1 in common.

Each processor 1 assigns a local space to a virtual space used when the instruction-processing section 8 of this processor performs arithmetic operations and control operations.

The multiprocessor system executes programs in parallel while transferring data between processors, using the global space. Where data is calculated within each processor 1, it is necessary to transfer data from the global space to the local space. In an ordinary system, overhead increases because of transfer of data from the global space to the local space, thus hindering speedup of parallel processing.

Accordingly, in this novel system, the local space in the instruction-processing section 8 and the local space in the transfer-processing section 10 are assigned to an identical real address.

The local address translation table 4a and the global address translation table 4b are so created that a real address for the local space and a real address for the global space are assigned to an identical real address. This assignment is made by the operating system 73.

Figure 8:
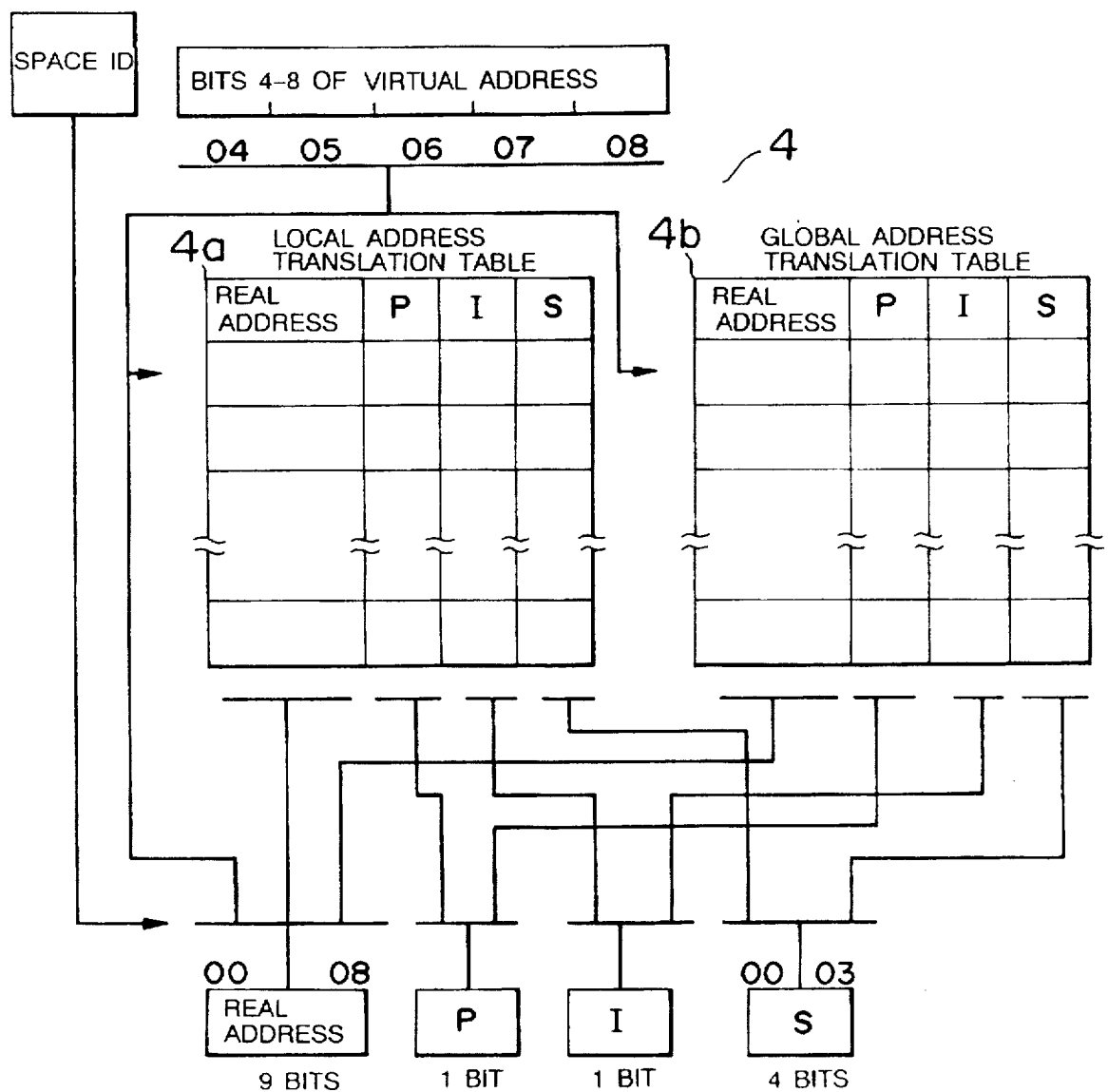
FIG. 8 is a diagram illustrating the process of a translation performed by an address translation table used in the system shown in FIG. 3.

The local address translation table 4a and the global address translation table 4b have plural entries corresponding to the number of bits of virtual addresses. The process in which a translation is made by the address translation table 4 is illustrated in FIG. 8. In the example of FIG. 8, of 32 bits of virtual addresses, five bits from bit 04 to 08 are used for search in the translation table. The translation tables 4a and 4b have 32 entries from 00 to 31, corresponding to the aforementioned 5 bits of information. The address translation table 4 selects some entries from the local address translation table 4a and from the global address translation table 4b according to the value of the virtual address supplied from the main storage access control section 6.

Figure 9:
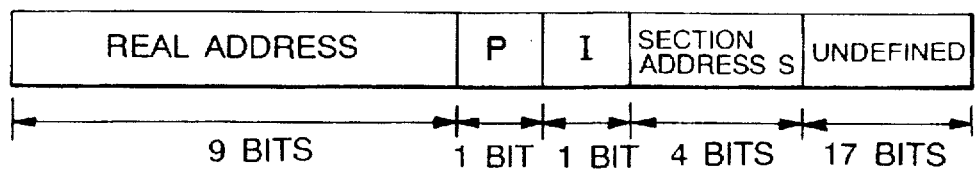
FIG. 9 is a diagram illustrating the contents of the address translation table shown in FIG. 8.

As shown in FIG. 9, information about section address S of 4 bits, invalid bit I of 1 bit, access protection bit P of 1 bit, and 9 bits of information about a real address are stored in each entry of the translation tables 4a and 4b. The real address corresponds to the above 9 bits of an address translated from a virtual address.

The 4 bits of the section address shown in FIG. 9 are used for comparison with the upper 4 bits of the virtual address supplied from the main storage access control section 6. If the virtual address and the section address agree, access to the main storage 7 is made. If they do not agree, "exception" is detected.

If the invalid bit I is set to 1, meaning that neither writing nor reading of data is valid, and if access to a storage region corresponding to an entry is made, then the "exception" is detected. If invalid bit I is set to 0, writing and reading of data are performed.

If the access protection bit P is set to 0, and if reading access to a region corresponding to an entry is made, then data is read out. If the access protection bit P is set to 1, and if writing access is made, then the "exception" is detected.

If the "exception" is not found in 32 bits of information of the entry corresponding to a virtual address of the entries of the translation tables 4a and 4b, the real address of this entry and various pieces of information about the bits S, P, and I are delivered to the selector circuit 5.

The selector circuit 5 receives the space ID specified by the header in the transfer queue 3 via the main storage access control section 6, and selects either one of the local address translation table 4a and the global address translation table 4b, depending on the space ID.

The selector circuit 24 receives an address translation control signal and selects either the translated address from the selector circuit 5 or the virtual address from the main storage access control section 6, according to the address translation control signal. The address selected by the selector circuit 24 is used as a real address when access to the main storage 7 is made.

Figure 10:
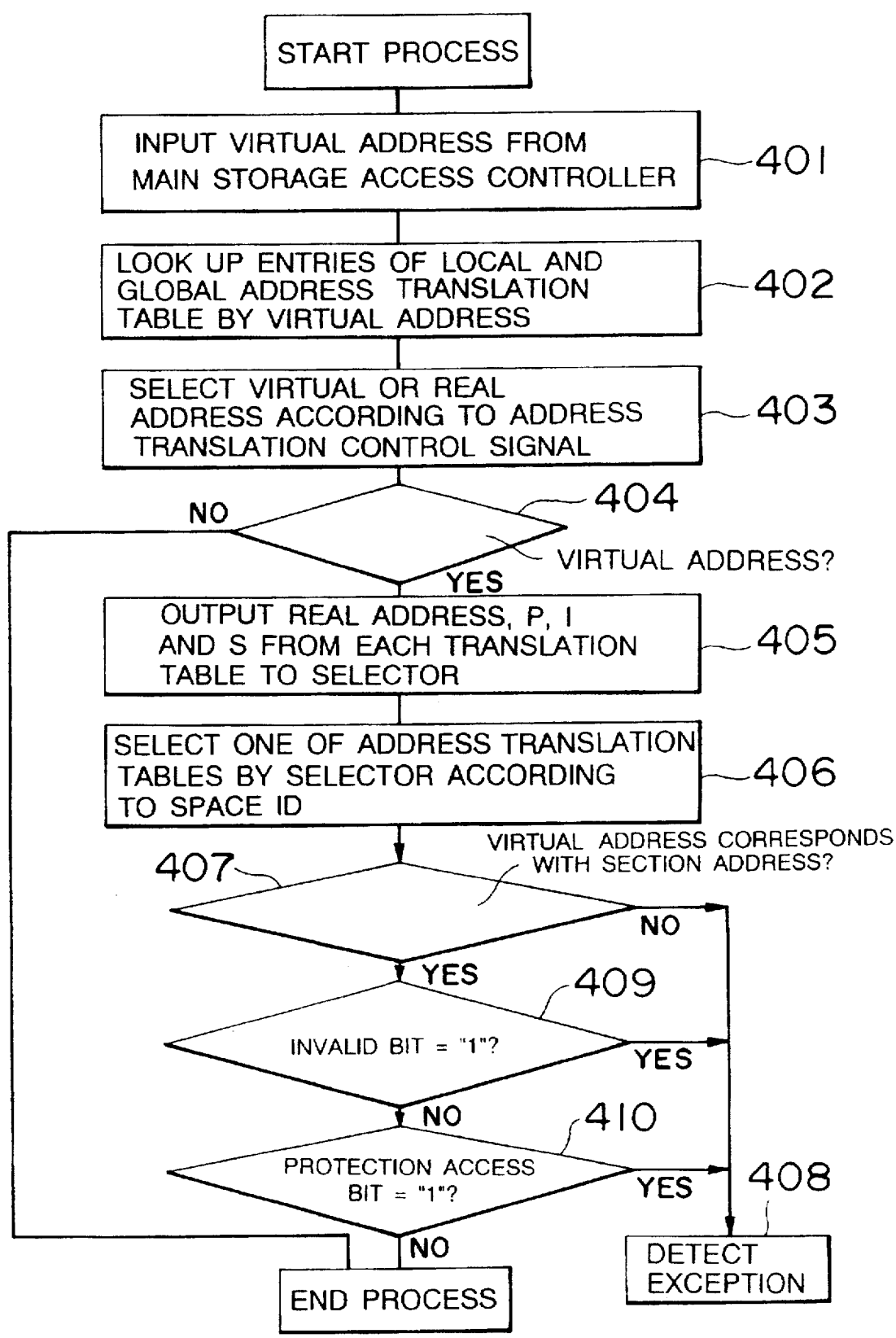
FIG. 10 is a flowchart illustrating processing performed by the address translator section of the system shown in FIG. 3.
Figure 11:
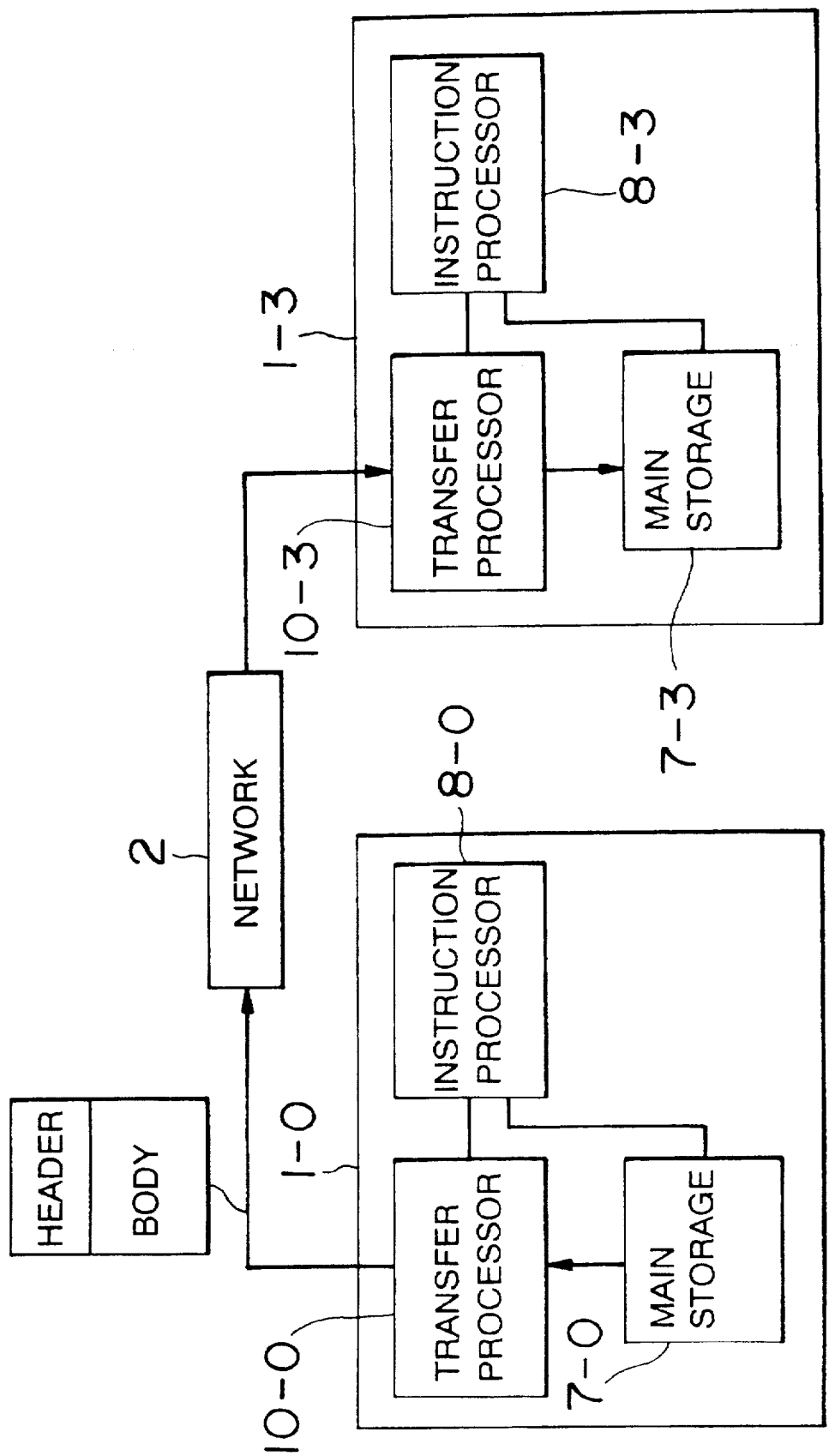
FIG. 11 is a diagram illustrating a writing access operation of the system shown in FIG. 3.
Figure 12:
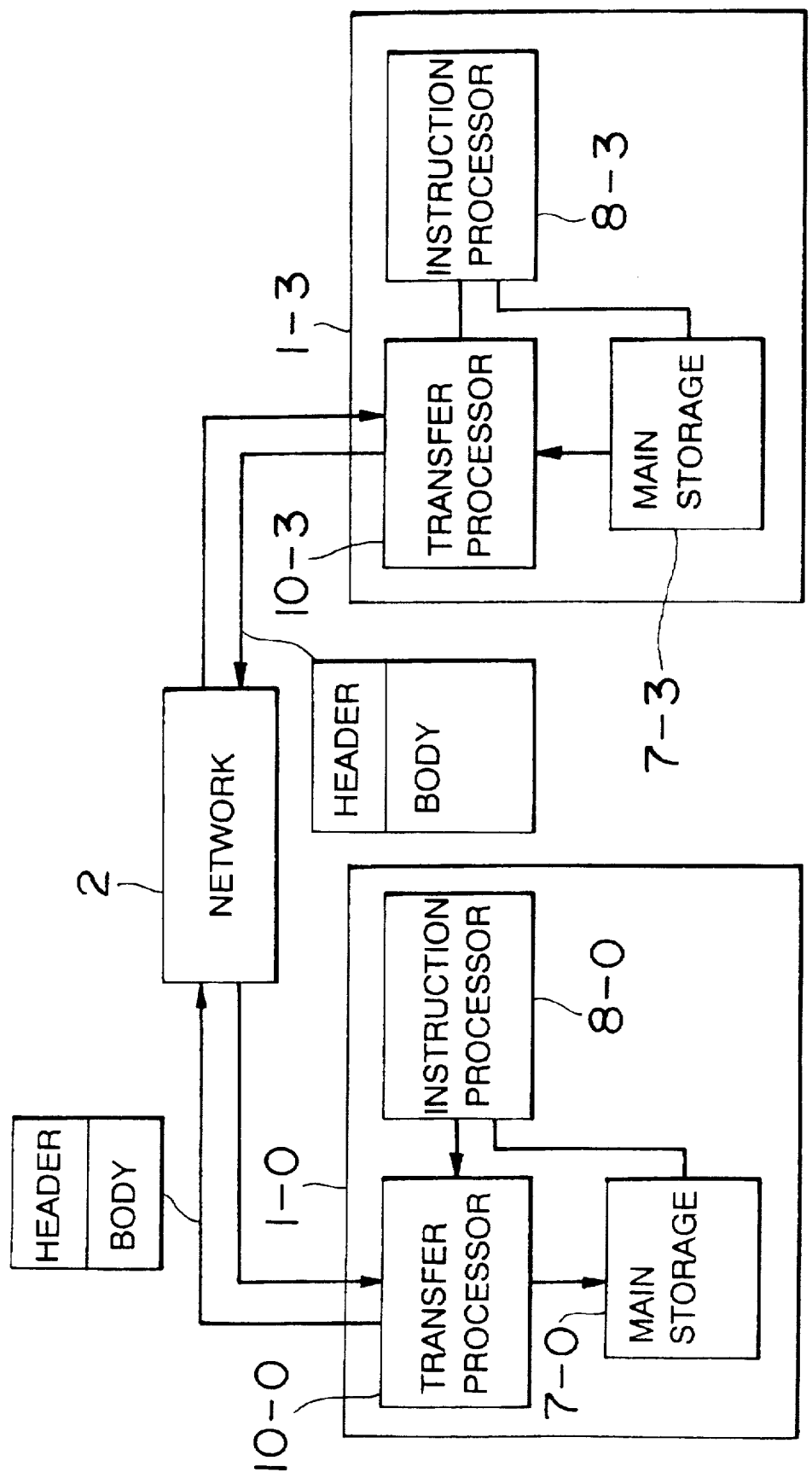
FIG. 12 is a diagram illustrating a reading acknowledge access operation of the system shown in FIG. 3.

FIG. 10 is a flowchart illustrating processing performed by the address translator section 13. FIG. 11 is a block diagram illustrating the functions of main sections of the translator section 13, for illustrating a writing access operation. FIG. 12 is a block diagram of main sections of the translator section 13, for illustrating a reading access operation.

As shown in FIG. 11, when data is written to processor 1-3 from processor 1-0, for example, the following processing is performed. When instruction-processing section 8-0 instructs transfer-processing section 10-0 to transfer data from main storage 7-0, the transfer-processing section 10-0 first reads a header from the main storage 7-0. Then, the processing section reads body data and transfers them in the form of a packet to the network 2. Subsequently, transfer-processing section 10-3 writes the packet into main storage 7-3.

As shown in FIG. 12, when data reading acknowledge access is made to processor 1-3 from processor 1-0, for example, the following processing is effected. When instruction-processing section 8-0 orders transfer-processing section 10-0 to transfer data from main storage 7-3, the transfer-processing section 10-0 transmits a small amount of header and body data as a reading request to transfer-processing section 10-3, the request indicating which data items should be read out.

Thereafter, the transfer-processing section 10-3 reads a packet consisting of header and body data from the main storage 7-3 according to the header of the request, whereby the section 10-3 makes a reading acknowledgment. Then, the transfer-processing section 10-0 writes the packet to the main storage 7-0.

Operation of Embodiment 2

Figure 13:
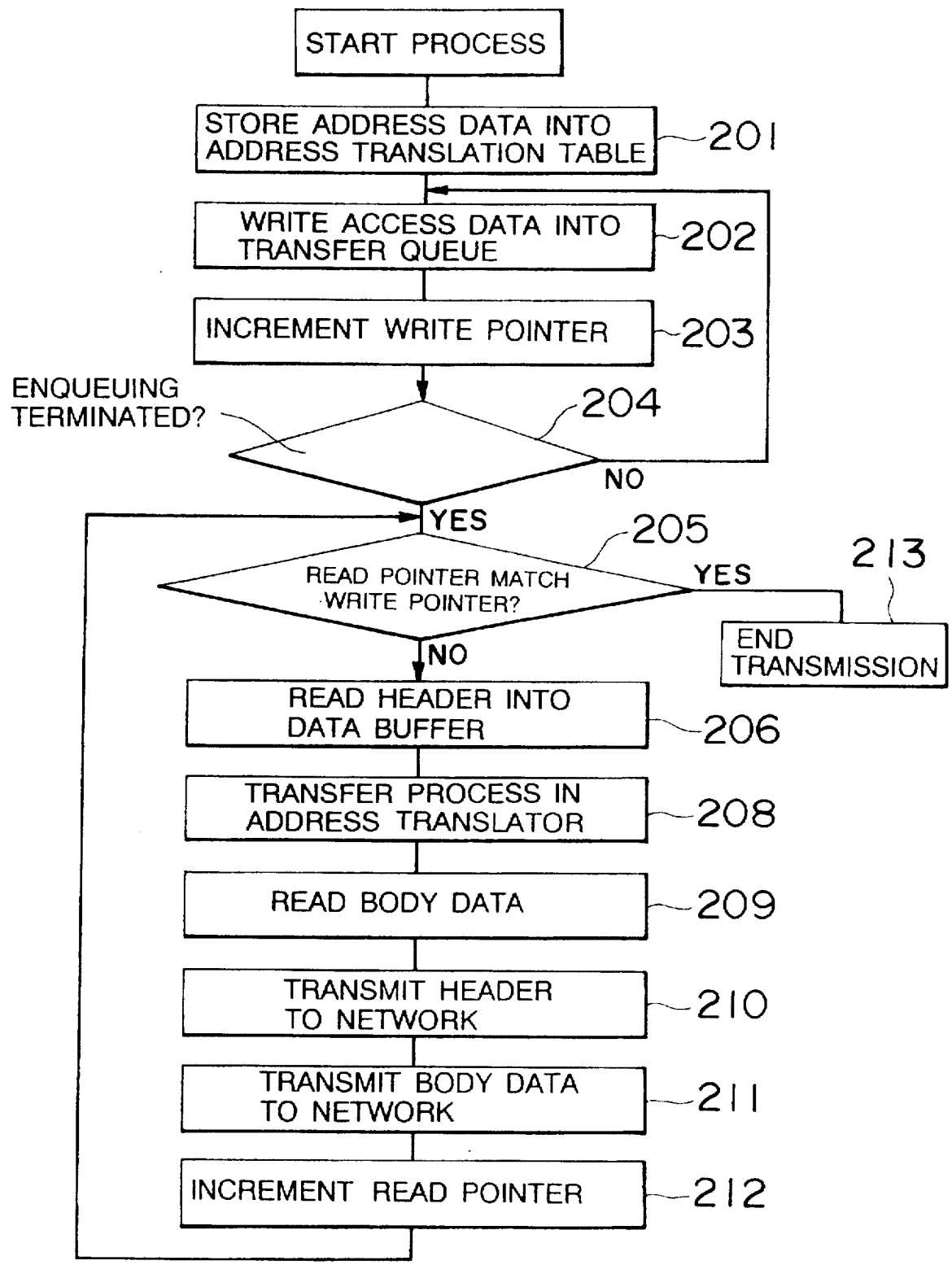
FIG. 13 is a flowchart illustrating packet transmission, processing of the system shown in FIG. 3.

FIG. 13 is a flowchart illustrating processing for packet transmission. Operations for this processing are described next by referring to this figure. The operating system 73 loads information about address translation into every entry of the address translation table 4 before the instructions of the user program 72 are executed (step 201).

The instruction-processing section 8 for executing the instructions of the user program 72 writes various kinds of information as access information for asking for data transfer to the transfer queue 3 in the main storage 7 as shown in FIG. 5, the information taking the form of the header of a packet. These various kinds of information include information for specifying a processor that is to receive, the length of body data, a transmitting address, a receiving address, the kind of transmitting space, and the kind of receiving space (step 202). The position of the transfer queue 3 inside the main storage 7 is given by position=transfer queue base address+transfer queue writing pointer×header length Then, the instruction-processing section 8 which executes the instructions of the user program 72 increments the value of the writing pointer in the transfer queue writing pointer section 16 (step 203).

Subsequently, the instruction-processing section 8 which executes the instructions of the user program 72 repeatedly writes access information about the transfer request to the transfer queue 3 and increments the value of the writing pointer in the transfer queue writing pointer register 16. Then, the instruction-processing section 8 makes a decision as to whether writing to the transfer queue 3 (enqueuing) has ended (step 204).

The network transfer control section 11 is activated by instructions from the instruction-processing section 8 and waits until the enqueuing of transfer request ends. If the instruction-processing section 8 ends the enqueuing, the network transfer control section 11 makes a decision as to whether the value of the transfer queuing reading pointer is coincident with the value of the transfer queuing writing pointer (step 205). If their values do not agree, the network transfer control section 11 judges that there is any unprocessed transfer request and starts transfer processing. The control section 11 causes a request for access to the main storage to the main storage access control section 6, for reading the header of the transfer packet.

The main storage access control section 6 calculates the address in the main storage 7 for the packet header of the oldest unprocessed transfer request from the transfer queue base address and from the transfer queue reading pointer. The control section 6 then gives reading access to the transfer queue 3 in the main storage 7 via the address translator section 13.

If a packet header is read from the transfer queue 3 in the main storage 7, a main storage access control section 12 loads the packet header into the data buffer 17 and informs the network transfer control section 11 that the reading of the packet header has been completed (step 206).

Then, the main storage access control section 6 reads a transfer mode, a transmitting space ID, and a receiving space ID from the header held in the data buffer 17. An LL permission control section 30 incorporated in the network transfer control section 11 makes a decision as to whether transfer of data according to tables 31–33 should be permitted, by referring to the transfer mode, the transmitting space ID, and the receiving space ID (step 207).

Furthermore, the network transfer control section 11 extracts access information for transfer of a transmitting address, a receiving address, etc., calculates the address of the body data in the packet, and grants reading access to the main storage 7 via the address translator section 13 (step 208).

At this time, the address translator section 13 performs processing as illustrated in FIG. 10. It accepts a virtual address from the main storage access control section 6 (step 401). Then, the translator section searches entries in the local address translation table 4a and in the global address translation table 4b according to the virtual address (step 402).

Then, the selector circuit 24 receives an address translation control signal indicating whether a virtual address should be translated into a real address, and selects either a translated address from the selector circuit 5 or a virtual address from the main storage access control section 6 according to the address translation control signal (step 403). This selected address becomes a real address when the main storage 7 is accessed.

A judgment is made as to whether the selected address is a virtual address or not (step 404). If the selected address is not a virtual address, the processing is ended.

If the selected address is a virtual address, the address translation table 4 delivers real addresses, P, I, and S corresponding to entries in the translation tables 4a, 4b to the selector circuit 5 (step 405).

Then, the selector circuit 5 selects either the local address translation table 4a or the global address translation table 4b according to the space ID from the main storage access control section 6 (step 406).

A judgment is made as to whether the upper 4 bits of a virtual address agree with the upper 4 bits of a section address S (step 407). If they do not agree, exception of access to the main storage 7 is detected (step 408).

If the virtual address is coincident with the section address S, a decision is made as to whether the invalid bit is "1" or not (step 409). If the invalid bit is "1", exception of writing and reading of data is detected (step 408).

If the invalid bit is 0, a decision is made as to whether the access protection bit P is bit "1" or not (step 410). If it is "1", exception of writing access is detected (step 408).

If the access protection bit is "0", a region corresponding to the entry is accessed, and data is read out. Processing is then ended.

It is assumed that the global space address table 4b is selected according to the space ID. In this case, the global space is common to all the processors. Therefore, when address translation information in the global address translation table 4b is rewritten, all the processors are synchronized.

We now assume that the local address translation address table 4a is selected according to the space ID. In this case, local spaces are inherent in their respective processors. Therefore, where address translation information in the local address translation table 4a is rewritten, it can be rewritten independent of other processors. If only rewriting of the local address translation table 4a is needed, then all the processors are not required to be synchronized. Consequently, the translation table can be rewritten with less overhead. The local address translation table 4a is rewritten more frequently than the global address translation table 4b.

In this way, either the local address translation table 4a or the global address translation table 4b is selected. A virtual address is translated into a real address by the selected translation table. Body data in packets are successively read from the main storage 7. Then, the main storage access control section 6 loads the body data serially into the data buffer 17 and informs the network transfer control section 11 of the sequential amounts of body data read out (step 209).

If the network transfer control section 11 is informed of the end of the reading of headers of packets by the main storage access control section 6, the control section 11 extracts access information about a transfer request from the data buffer 17, inspects the information in a given manner, modifies the information, and writes the access information back into the data buffer 17.

Then, the network transfer control section 11 transmits packet headers to the network 2 from the data buffer 17 (step 210). If the control section 11 is informed of sequential amounts of body data in the form of packets read out by the main storage access control section 6, then the control section 11 sequentially transmits body data in the form of packets held in the data buffer 1 to the network 2 (step 211).

If transmission of packets from the transfer-processing section 10 to the network 2 ends in this way, the network transfer control section 11 increments the transfer queue reading pointer (step 212), and then control returns to step 205. The control section 11 then compares the value of the transfer queue reading pointer with the value of the transfer queue writing pointer. If they do not agree, i.e. if any unprocessed transfer request remains, then the next transfer processing is performed (steps 206–212). The data transfer processing is repeated until the value in the transfer queue reading pointer is equal to the value in the transfer queue writing pointer. If they become coincident, the data transfer processing is ended (step 213).

The processing described thus far is processing for transferring packets from a transmitting processor to a receiving processor. This processing is included in operations when writing access is made, as schematically shown in FIG. 11.

Processing for Writing Packets to Receiving Processor

Figures 14, 15:
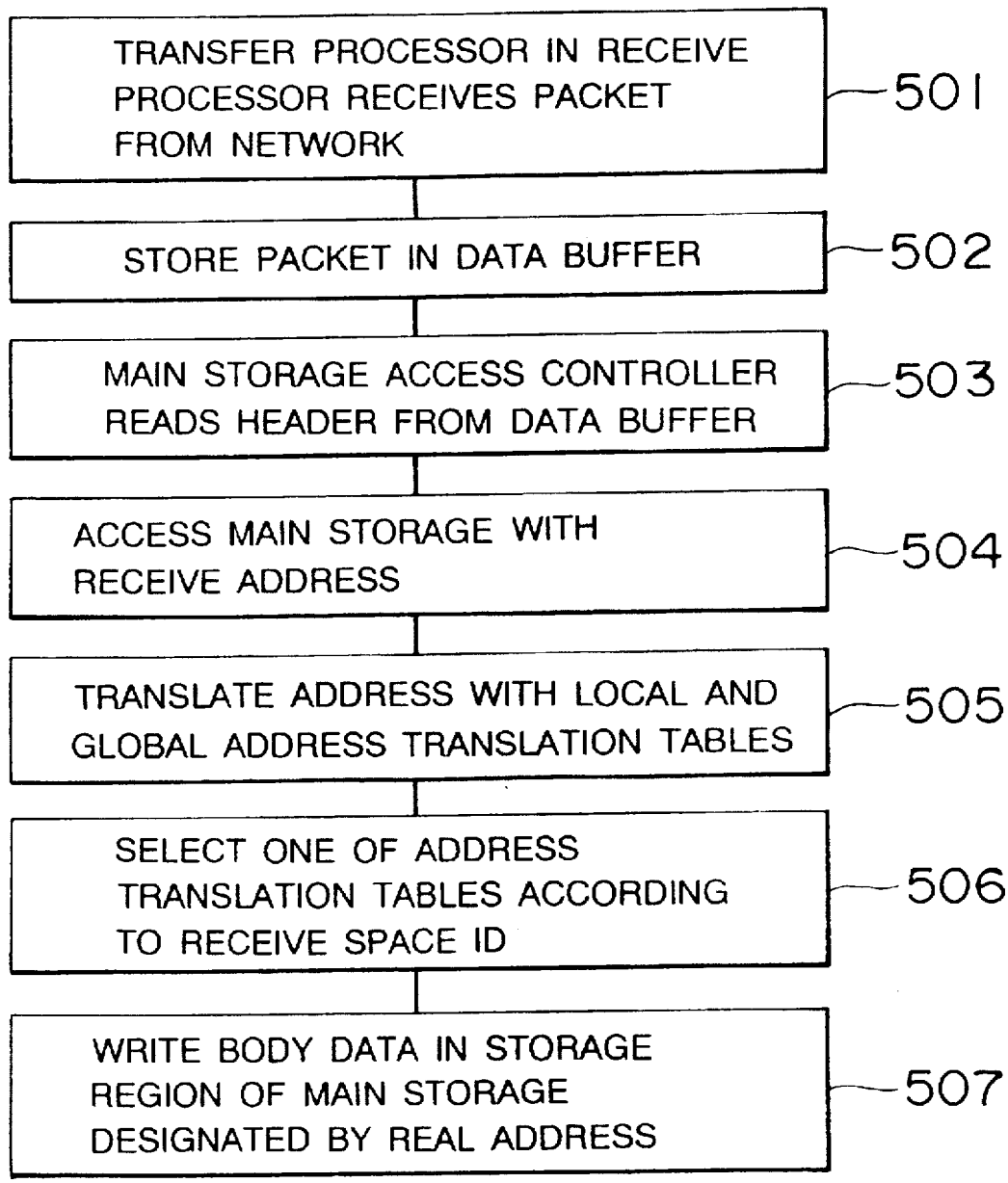
FIG. 14 is a flowchart illustrating processing performed by a receiving processor of the system shown in FIG. 3.
FIG. 15 is a diagram showing a part of a FORTRAN program described for serial processing of the system shown in FIG. 3.

Of the operations performed during writing access shown in FIG. 11, processing for writing packets to the main storage of a receiving processor is described. FIG. 14 illustrates processing for writing to the receiving processor.

First, the network 2 transfers packets from the transmitting processor and connects a processor that is to receive with the processor transmitting the packets according to the information specifying the receiving processor included in the header.

Then, the transfer-processing section 10 in the receiving processor receives packets from the network 2 (step 501). In the transfer-processing section 10, the data buffer 17 temporarily stores the packets (step 502). The main storage access control section 6 reads a header from the data buffer 17 (step 503), and gains access to the main storage 7 via the address translator section 13 according to the receiving address in the header (step 504).

In the address translator section 13, the local address translation table 4a and the global address translation table 4b translate virtual addresses into real addresses (step 505). At this time, the selector circuit 5 selects either the local address translation table 4a or the global address translation table 4b according to the receiving space ID in the header (step 506).

Generally, in processing for transferring data between processors, their respective global spaces are used and so the global address translation table 4b is selected. This table 4b translates a virtual address into a real address. Body data in the data buffer 17 is written to the storage region specified by the real address in the main storage 7 (step 507).

Transfer of Data from Global Space to Local Space within the Same Processor and Calculations under Program Control We will now describe a case in which a receiving processor performs calculations under program control, using body data received from a transmitting processor. It is assumed that receiving processor 1-2 receives packets and executes a program written in FORTRAN, for example. FIG. 15 illustrates a part of the FORTRAN program created for serial processing. In this figure, one processor calculates arrays A and B in the FORTRAN program.

In order for the multiprocessor system to execute this FORTRAN program, a working array C is defined as well as the arrays A and B. The array B is assigned to the global spaces formed in the processors. The arrays A and C are assigned to the local spaces formed in the processors. Units of processing are assigned to the processors according to the value of I of a DO statement.

FIG. 16 illustrates assignment of the arrays to 10 processors. For instance, partial array B (101:200) consisting of elements 101 to 200 which is a subset of array B is assigned to the global space in a processor 1-2 (PE2 in FIG. 16). Partial arrays A (101:200) and C (100:201) are assigned to a local space in the processor 1-2. The instruction-processing section 8 in the processor 1-2 performs calculations on an array of bits I from 101 to 200.

An address translation table corresponding to a divided global space of array B is the global address translation table 4b provided in each processor. An address translation table corresponding to a divided local space of array C is the local address translation table 4a provided in each processor. A divided local space of array A is a virtual space in which the instruction-processing section 8 performs calculations.

Example of Transfer between Spaces within the Same Processor

FIG. 17 illustrates a program to be executed by a processor. When a program as shown in FIG. 17 is executed, if an address translation as in the described embodiment is not utilized, the following processing is performed.

Prior to calculations, data is transferred from global space B to local space C. With respect to B(100), data is read from the global space B of processor 1-1 and transferred to local space C. With respect to B(101:200), real addresses are different and so data is serially transferred from the global space of its processor 1-2 to the local space C. Then, B(201) is read from the global space of processor 1-3 and transferred to the local space C. In this way, processing is performed while changing the value of I from 100 to 201. After the completion of the processing, a calculation is performed on DO statement 10.

However, in the example of FIG. 17, a considerable time is taken to transfer data from a global space to a local space.

Figure 18:
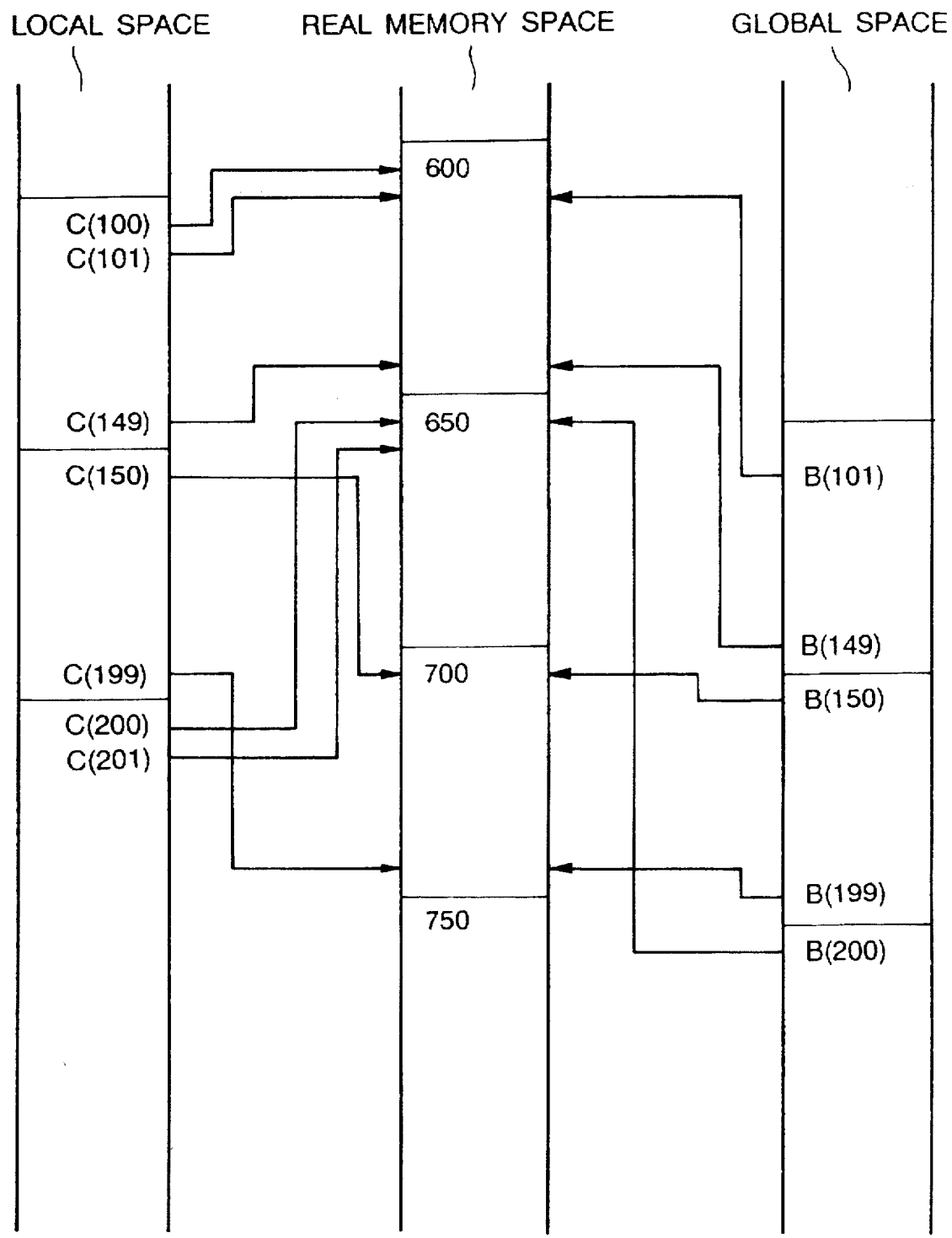
FIG. 18 is a diagram illustrating mapping of arrays B and C onto a real main storage in a processor of the system shown in FIG. 3.
Figures 19, 20:
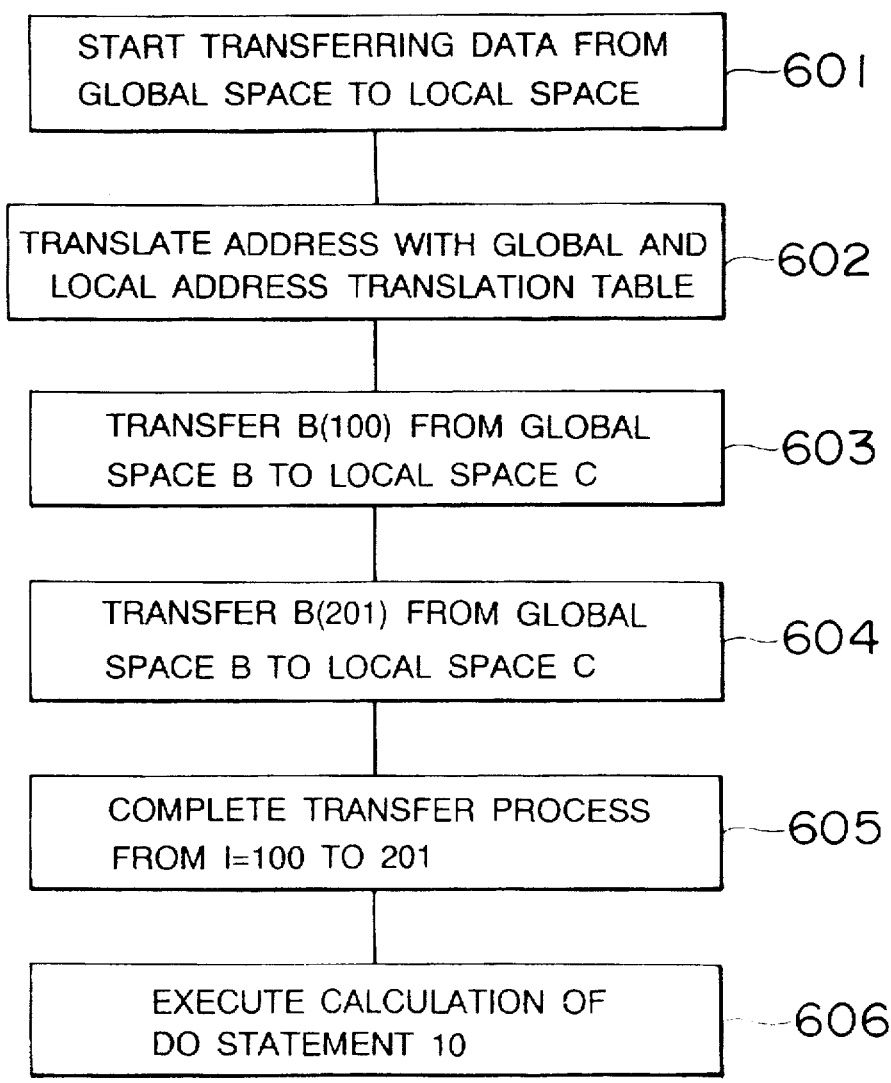
FIG. 19 is a diagram illustrating a simplified version of the programs shown in FIG. 3.
FIG. 20 is a flowchart illustrating an example of processing for transfer within one processor of the system shown in FIG. 3.

Accordingly, the time taken to transfer data from a global space to a local space is shortened, using the local address translation table 4a and the global address translation table 4b used in the described embodiment. FIG. 18 is a diagram illustrating mapping of arrays B and C in each processor onto a real main storage. FIG. 19 is a diagram illustrating a program that is a simplified version of the program to be processed. FIG. 20 is a flowchart illustrating an example of transfer processing.

The relation among the local address translation table 4a, the global address translation table 4b, and real address is described now by referring to FIG. 18. For example, arrays C(100) through C(201) are assigned to the local space of processor 1-2. Arrays B(100) through C(201) are assigned to the global space of the processor 1-2. Elements of the arrays in the local space and elements of the arrays in the global space are made to correspond to an identical address in a real memory space corresponding to a real address. For example, array element C(200) and array element B(200) are both made to correspond to address 650. Every array element corresponds to 32 entries of each address translation table.

Transfer processing and arithmetic processing will now be described. First, the transfer-processing section 10 causes the main storage to transfer data from the global space to the local space (step 601).

Addresses are translated by the global address translation table 4b and the local address translation table 4a in the transfer-processing section 10 (step 602).

The array B(100) is read from the global space B in the processor 1-1 and transferred to the local space C (step 603).

With respect to B(101:200), the global address translation table 4b and the local address translation table 4a are made to correspond to an identical real address. That is, it is not necessary to transfer data from the global space in the same processor 1-2 to the local space C.

The array B(201) is read from the global space in processor 1-3 and transferred to the local space C (step 604).

In this way, transfer processing is effected while changing I from 100 to 201 (step 605). Thereafter, a calculation is performed on DO statement 10 (step 606). At this time, the array C is a local space in the transfer-processing section 10 and, therefore, the array C is the same as the virtual space in the instruction-processing section 8. Consequently, the local space is used for calculations performed by the instruction-processing section 8.

In this system, the aforementioned simplified processing is performed for every value of I, i.e., from 101 to 200. Hence, the program illustrated in FIG. 17 is simplified to the program of FIG. 19. In this way, transfer of C(101:200) and B(101:200) can be omitted. This accelerates parallel processing.

In the system, when the writing access operations illustrated in FIG. 11 are carried out, calculations are performed, using data received by a receiving processor. Also, when the reading acknowledge access operations illustrated in FIG. 12 are performed, a processor causing a reading request may perform calculations, using data received from another processor.

In the novel apparatus for transferring data between a plurality of processors and for processing data, a global space and a local space are made to correspond to each other. In consequence, overhead can be reduced when data is transferred between processors without the need for complex algorithmic or extra access information. This speeds up parallel processing.

What is claimed is:

1. A parallel processing method for processing data transferred between a plurality of processors each having a storage, said method comprising the steps of:

in each of said plurality of processors, corresponding a global virtual address in a global virtual memory space where a parallel processing between the plurality of processors is performed and a local virtual address in a local virtual memory space where an individual process in one of the plurality of processors is performed to an identical real address;

transferring data from a first one of said plurality of processors to a second one of said plurality of processors by writing the data into the storage of the second processor according to the global virtual address of the second processor;

notifying the second processor of the global virtual address of the transferred data;

translating the notified global virtual address into the real address which corresponds to the notified global virtual address; and reading data from the storage of the second processor to the second processor according to the translated real address.

2. A method according to claim 1, wherein said step of transferring data between processors includes the step of introducing data necessary for a calculation into said global virtual memory space from said second processor and transferring the data from said global virtual memory space to said local virtual memory space.

3. A method according to claim 1, further comprising the steps of:

storing access information indicating attributes for having access to the storage in said first processor and to the storage in said second processor in association with the data and storing space discrimination information for discriminating between said global virtual memory space and said local virtual memory space; and selecting one of said local virtual address translation and said global virtual address translation according to said stored space discrimination information.

4. A method according to claim 3, wherein said access information includes information specifying one of said processors that is to receive information about a transfer mode indicating whether data is written or read, and information about a length of data body, a transmitting address, and a receiving address.

5. A parallel processing apparatus for processing data transferred between a plurality of processors each having a storage, said apparatus comprising:

address means, in each of said plurality of processors, for corresponding a global virtual address in a global virtual memory space where a parallel processing between the plurality of processors is performed and a local virtual address in a local virtual memory space where an individual process in one of the plurality of processors is performed to an identical real address;

transfer means for transferring data from a first one of said plurality of processors to a second one of said plurality of processors by writing the data into the storage of the second processor according to the global virtual address of the second processor;

notification means for notifying the second processor of the global virtual address of the transferred data;

translation means for translating the notified global virtual address into the real address which corresponds to the notified global virtual address; and reading means for reading data from the storage of the second processor to the second processor according to the translated real address.

6. An apparatus according to claim 5, wherein said transfer means, if data necessary for a calculation exists in said second processor, introduces said data necessary for said calculation into the global virtual memory space from said second processor and transfers the data from the global virtual memory space to said local virtual memory space.

7. An apparatus according to claim 5, further comprising:

information storage means for storing access information indicating attributes for having access to the storage in said first processor and to the storage in said second processor in association with data and for storing space discrimination information for discriminating between said global virtual memory space and said local virtual selector means for selecting one of said local virtual address translation and said global virtual address translation according to the space discrimination information stored in said information storage means.

8. An apparatus according to claim 7, wherein said access information includes information specifying one of said processors that is to receive information about a transfer mode indicating whether data is written or read, and information about a length of data body, a transmitting address, and a receiving address.

* * * * *